United States Patent

Gould et al.

[11] Patent Number: 5,937,710
[45] Date of Patent: Aug. 17, 1999

[54] HARMONIC-DRIVE TRANSMISSION

[75] Inventors: Mark A. Gould, Ipswich; Robert G. Berry, Danvers, both of Mass.

[73] Assignee: Teijin Seiki Boston, Inc, Peabody, Mass.

[21] Appl. No.: 09/056,472

[22] Filed: Apr. 6, 1998

[51] Int. Cl.$^6$ .................................................. F16H 33/00
[52] U.S. Cl. ........................ 74/640; 74/665 A; 74/665 B; 74/665 E
[58] Field of Search ................................. 74/640, 665 D, 74/665 E, 665 B, 665 A, 665 R; 475/1, 5

[56] References Cited

U.S. PATENT DOCUMENTS

| | | | |
|---|---|---|---|
| 2,603,983 | 7/1952 | Rieser | 74/640 |
| 2,906,143 | 9/1959 | Musser | 74/640 |
| 3,487,722 | 1/1970 | Cline | 74/640 |
| 4,479,403 | 10/1984 | Marschner et al. | 74/640 |
| 4,840,090 | 6/1989 | Iwata | 74/640 X |
| 4,969,376 | 11/1990 | Fickelscher | 74/640 |
| 5,772,573 | 6/1998 | Hao | 74/640 X |

FOREIGN PATENT DOCUMENTS 212556  12/1984  Japan ........................ 74/640

OTHER PUBLICATIONS

C. W. Musser—The Hamronic Drive—United Shoe Machinery Corporation—pp. 6–13, 1960.

*Primary Examiner*—Charles A. Marmor
*Assistant Examiner*—Ha Ho
*Attorney, Agent, or Firm*—Don Halgren

[57] ABSTRACT

A phasing differential gear assembly is arranged in a housing, for the speed adjustment of an output shaft which shaft may be utilized to control tension in a web on a drum being driven by the output shaft. A driven input shaft having a second end imparts a first rotational speed to a co-axially arranged first end of the output shaft. A first external toothed gear is arranged on the first end of the input shaft, and a second external gear is disposed between the second end of the input shaft and the first end of the output shaft. A third external toothed gear is disposed on the first end of the output shaft. A first flexible gear is arranged radially outwardly of the first and second external gears, and a second flexible gear is arranged radially outwardly of the second and third external gears. A first wave generator is arranged radially outwardly of the first flexible gear, and a second wave generator is arranged radially outwardly of the second flexible gear. The input shaft and the output shaft are arranged to rotate at a common speed through a coupling of the second external gear and first and second flexible gears. The first wave generator is actuatable to vary the output speed of the output shaft from the input speed of the input shaft.

10 Claims, 2 Drawing Sheets

HARMONIC-DRIVE TRANSMISSION

BACKGROUND OF THE INVENTION

1. Field of the Invention

The invention relates generally to harmonic drive gearing arrangements, and more particularly to a harmonic drive having output drives which can be adjusted while under power and rotating, for effecting tensional adjustments in a web of material being driven by the output.

2. Prior Art

Strain wave gearing, otherwise known as harmonic drive transmissions, is well known in the art as seen for example in U.S. Pat. No. 2,906,143 granted to Musser. A typical strain wave gearing comprises of a rigid circular spline, a flex spline disposed inside the circular spline, the flex spline being deformable into for example an elliptic configuration to bring the flex spline into engagement with the circular spline at 2 points and further have a number of teeth which is larger or smaller than the number of the circulus spline by two n, ("n" being a positive integer), and a wave generator disposed in the flex spline to deform the flex spline to for example an elliptic configuration so as to bring the flex spline into the engagement with the circulus spline at the two points on the major axis of the ellipsoid. The wave generator includes an elliptic cam plate and a ball bearing fittingly mounted on the outer periphery of the cam plate. The outer race of the bearing is inserted into the flex spline to deform the flex spline to the elliptic shape. In the strain wave gearing, as mentioned hear and about, the input shaft is fixed to the cam plate of the wave generator and rotated while the ellipsoid of the flex spline is rotated. Upon rotating the ellipsoid, one of the flex spline and the circulus spline is rotated relative to the other by amount that is in proportion to the difference in the number of teeth of the two splines. When an output shaft is mounted on either the flex spline or the circulus spline, the output shaft is rotated very slowly in comparison with the input shaft. Thus the strain wave gearing has frequently been applied to precision machinery, because in the gearing, a high reduction ratio is obtained in spite of a small number of elements used therefor.

There are harmonic drive mechanisms wherein drive members are external gears and are arranged at the center of the drive. The flexible member would thereby be an internal gear and the wave generator would be located on the outside of the drive. However, typically the drive cannot be adjusted by the external wave generator while the output drives are under power and located.

It is therefor an object of the present invention to overcome the disadvantages of the prior art.

It is a further object of the present invention, to provide a drive which may be adjusted by an external wave generator while the output drives are under power and rotating.

BRIEF SUMMARY OF THE INVENTION

The present invention comprises a paired inside-out harmonic drive pancake gear arrangement for use as a phasing differential-gear set. The gear arrangement of the present invention comprises a co-axial arrangement of three rigid external gears co-axially distributed. The two outer external gears act as output members of the drive. The three rigid co-axially adjacent external gears are arranged radially within a pair of (non-rigid) flexible internal gears. The two axially-outermost external rigid gears have fewer teeth than the number of teeth on their radially adjacent flexible internal gears. The "middle" rigid external gear has a number of gear teeth corresponding to the number of teeth in the two radially adjacent flexible gears. The middle rigid external gear member rotates with both of the radially adjacent flexible gears, acting as a torque coupling. A ball bearing assembly is engagingly arranged radially outwardly of each of the two flexible internal gear members. The ball bearing assemblies are each arranged within a radially outwardly disposed, rigid, wave-generating, outer ring, each outer ring having an elliptical shape ground into their inside annular surface. Each ball bearing assembly is pressed into the elliptical shaped opening in their respective outer rings. The wall of the outer rings are rigid and force the previously-round ball bearing assemblies to take the shape of the ellipses into which they are forced, and thereby become the wave generators themselves.

Each ball bearing assembly of the present assembly is arranged within its respective rigid outer ring, and thus itself becomes a portion of the respective externally disposed wave generator. Since the center external gear member has the same number of teeth as both of the outer flexible internal gears (flexsplines), the side inner rings move in concert "when neither external wave generator is rotated".

When one external ring or external wave generator is moved relative to the adjacent external wave generator, a 100 to 1 reduction ratio may be created, depending upon the number of teeth differential between the gear sets and the direction of spin of the external generator moved.

If for example, the output of each external ring gear were attached to a pulley or drum driving a conveyer (or conveyed) belt, and the external outer ring members were given no rotational movement whatsoever, the conveyer (conveyed) belt powered by one side of the external ring gears, would rotate the belt at a steady pace. If, however, one of the outer ring (wave generating) members was rotated with respect to its adjacent outer ring (wave generating) members, the drum supporting the conveyor belt (or conveyed belt) driven by the external gear member radially within the rotated outer ring, would be rotated at a slightly different rotational speed, so as to adjust the tension of the belt driven between two drums supporting the belt. Depending on the direction of the rotation of the rotated outer flexspline ring, the belt supported between two adjacent empowered drums may be given a tension or a loosening of that belt being driven by the harmonic drive gear assembly drive system.

Such a drive system may be utilized for a conveyed belt, such as for example, printed material, comprised of a film of plastic, paper or the like. A plurality of drums (or pulley devices) support the elongated path of flexible material proceeding through a series of printing presses, and each require modulation of speed to control the speed and tension of the material (belt) being printed, for example, newsprint, a polymer film to be utilized as a wrapper. By virtue of the ability to tighten or loosen the web or belt comprising the film being printed, the print matter may be adjusted to prevent overlap or misprint thereof. Such events occur in color newspaper print, magazines and labels. Expensive controls and interconnected motors need not be utilized because of this simpler gearing arrangement of the present invention.

The invention thus includes a phasing differential gear assembly arranged in a housing, for the speed adjustment of an output shaft, comprising a driven input shaft having a second end for imparting a first rotational speed to a co-axially arranged first end of the output shaft. A first external toothed gear is arranged on the first end of the input shaft, a second external gear is disposed between the second end of the input shaft and the first end of the output shaft. A third external toothed gear is disposed on the first end of the output shaft. A first flexible gear is arranged radially outwardly of the first and second external gears, and a second flexible gear is arranged radially outwardly of the second and third external gears. A first wave generator is arranged radially outwardly of the first flexible gear, and a second wave generator is arranged radially outwardly of the second flexible gear, the input shaft and the output shaft arranged to rotate at a common speed through a coupling of the second external gear and first and second flexible gears, the first wave generator being actuatable to vary the output speed of the output shaft from the input speed of the input shaft. The first and second wave generators are annular members having an inner opening of elliptical shape. Each of the wave generators includes a ball bearing assembly arranged within the inner opening. One of the wave generators is rotatable with respect to the other wave generator of the wave generators, to induce wave generation in the flexible gear radially therewithin. The output shaft in one embodiment, may be connected to a drum, the drum being arranged to rotatably support a conveyed belt. The input shaft has an input drive member inputting rotation thereto.

The invention in a further embodiment includes a method of adjusting the tension in a moving belt carried on a rotatable drum supported on an axis. The method comprises the steps of attaching one end of an output shaft of a harmonic drive transmission to the axis supporting the drum; placing a second external gear on the other end of the output shaft, the second external gear having a second wave generator and a second flexspline disposed radially therearound; arranging a rotary powered input axis into the harmonic drive transmission, in coaxial alignment with the output axis, and a first external gear on a second end thereof, the first external gear having a first wave generator and a first flexspline disposed radially therearound; connecting the first external gear to the second external gear by a middle external gear engaged to both of the first and second flexsplines supported by the wave generators; rotating the input axis; and rotating the first wave generator with respect to the second wave generator to alter the rotational output speed of the output shaft with respect to the rotational input speed of the input shaft.

The invention in yet a further embodiment includes a method of correcting the alignment and printing of a web being carried through a printing press by adjusting the tension in said web carried on a rotatable drum supported on an axis, comprising the steps of: attaching one end of an output shaft of a harmonic drive transmission to the axis supporting the drum; placing a second external gear on the other end of the output shaft, the second external gear having a second wave generator and a second flexspline disposed radially therearound; arranging a rotary powered input into the harmonic drive transmission, in coaxial alignment with the output shaft, and a first external gear on a second end thereof, the first external gear having a first wave generator and a first flexspline disposed radially therearound; connecting the first external gear to the second external gear by a middle external gear engaged to both of the first and second wave generators; and rotating the input shaft; and rotating the first wave generator with respect to the second wave generator to alter the rotational output speed of the output shaft with respect to the rotational input speed of the input shaft thereby adjusting the tension of the web being printed to correct the alignment of the web with respect to the printing press.

The method including the step of stopping the rotation of first wave generator with respect to the second wave generator, once the tension in the web is correct, to permit the input shaft and the output shaft to rotate at a common speed, once the tension adjustment in the web has been made and the alignment of the web has been accomplished with respect to the printing press.

The method includes the step of stopping the rotation of the first wave generator with respect to the second wave generator once the tension in the belt is correct, to permit the input shaft and the output shaft to rotate at a common speed.

BRIEF DESCRIPTION OF THE DRAWINGS

The object and advantages of the present invention become more apparent when viewed in conjunction with the following drawings, in which.

DESCRIPTION OF THE PREFERRED EMBODIMENTS

Figure 1:
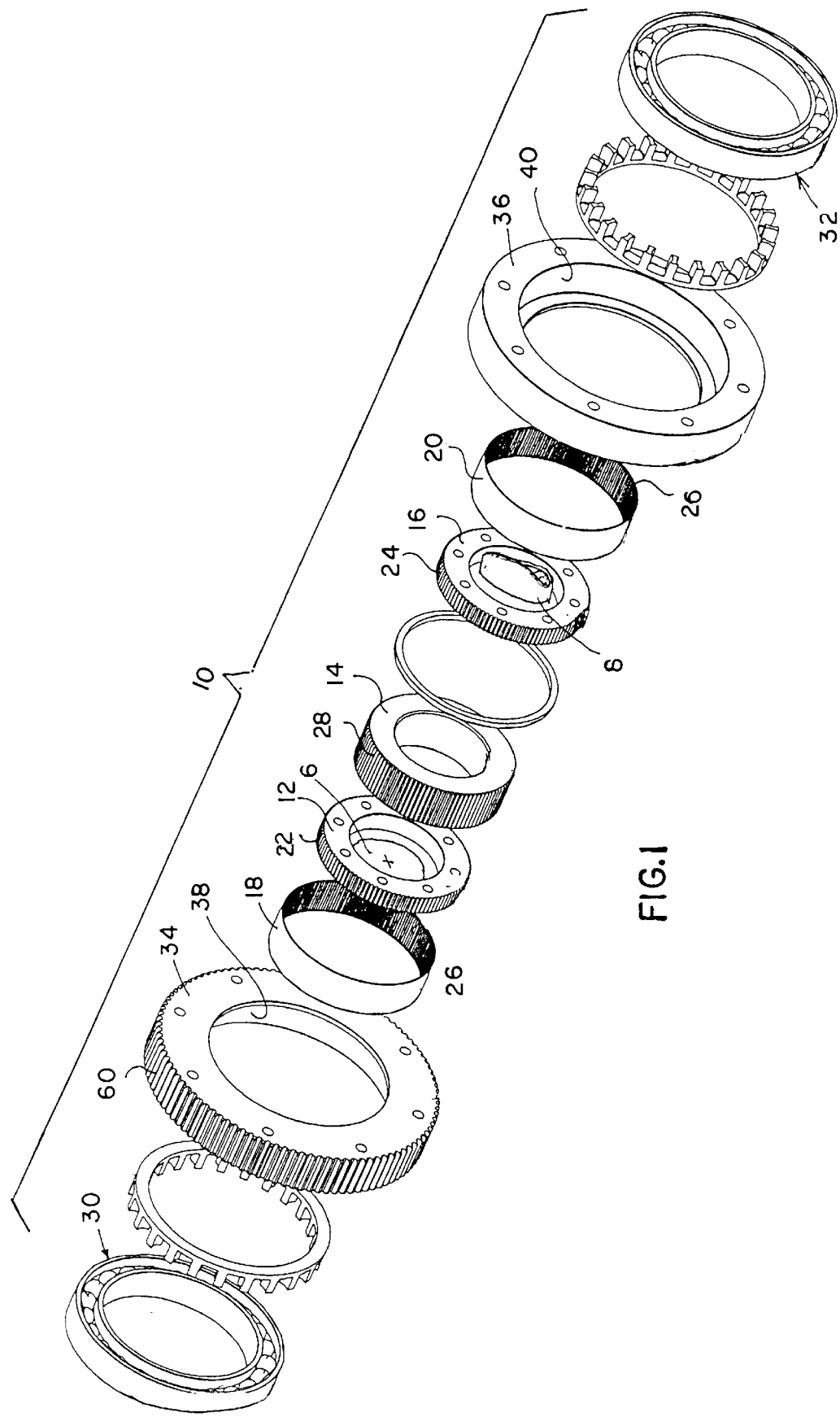
FIG. 1 is an exploded view of a harmonic drive gear assembly constructed according to the principals of the present invention.

Referring to the drawings in detail, and particularly to FIG. 1, there is shown the present invention which comprises a paired, inside-out harmonic drive pancake gear assembly 10, shown in an exploded view, for use as a phasing differential-gear set, as explained hereinbelow. The gear arrangement 10 of the present invention comprises a co-axial arrangement of three commonly diametered, rigid external gears 12, 14 and 16, co-axially distributed. The two outer external gears 12 and 16 act as input and output members of the drive assembly 10. The first external gear 12 is supported on a drive shaft 6, and the second external gear 16 is supported on a co-axial yet separate drive shaft 8, which shaft 8 may drive a drum or pulley explained hereinbelow. The three rigid co-axially adjacent external gears 12, 14 and 16 are arranged radially within a pair of (non-rigid) flexible internal gears 18 and 20. The two axially-outermost external rigid gears 12 and 16 have fewer (external) teeth 22 and 24 respectively, than the number of internal teeth 26 on their radially adjacent flexible internal gears 18 and 20. The "middle" rigid external gear 14 has a number of gear teeth 28 corresponding to the number of internal teeth 26 in the two radially adjacent flexible gears 18 and 20. The middle rigid external gear member 14 rotates with both of the radially adjacent flexible gears 18 and 20, acting as a torque coupling. Ball bearing assemblies 30 and 32 are engagingly arranged radially outwardly of each of the two flexible internal gear members 18 and 20. The ball bearing assemblies 30 and 32 are each arranged within a radially outwardly disposed, rigid, wave-generating, outer ring 34 and 36 respectively, each outer ring 34 and 36 having an elliptical shape ground into their inside annular surface openings 38 and 40 respectively. Each ball bearing assembly 30 and 32 is pressed into the elliptical shaped opening 38 and 40 in their respective outer rings 34 and 36. The wall of the outer rings 34 and 36 are rigid and force the previously-round ball bearing assemblies 30 and 32 to take the shape of the ellipses into which they are forced, and thereby become the wave generators themselves.

Figure 2:
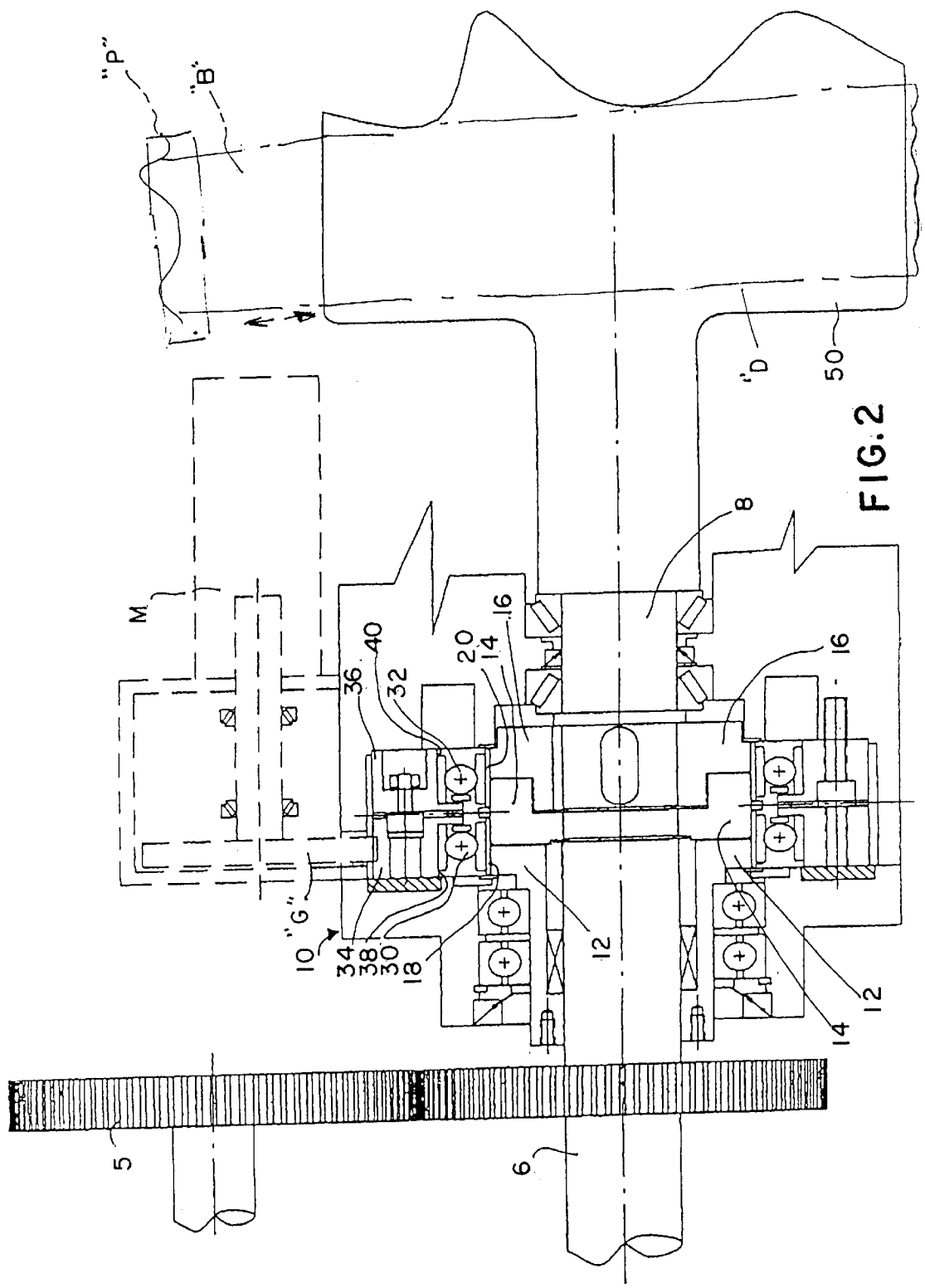
FIG. 2 is a side elevational view in section of the assembled harmonic drive assembly shown in FIG. 1, arranged to drive a belt support roll thereby, in a belt tensioning-adjustable manner.

Each ball bearing assembly 30 and 32 of the present assembly is arranged within its respective rigid outer ring, as may be seen in FIG. 2, and thus itself, becomes a portion of the respective externally disposed wave generator. Since the center external gear member 14 has the same number of teeth as both of the outer flexible internal gears (flexsplines) 18 and 20, the side gears 12 and 16 move in concert with one another, "when neither external wave generator is rotated".

When one external ring or external wave generator 34 or 36 is moved relative to its adjacent external wave generator 36 or 34, a 100 to 1 reduction ratio may be created, depending upon the number of teeth differential between the gear sets and the direction of spin of the external generator moved.

If for example, the output of the second external (ring) gear 16 were attached through shaft 8, to a pulley P or drum 50, as may be seen in FIG. 2, driving a conveyer (or conveyed) belt "B", and neither of the external outer ring gear members 34 and 36 were given an outside rotational movement whatsoever, the conveyer (or conveyed) belt "B" powered by input from a geared drive source 52, that is, the output side of the external gears 16, would move or rotate the belt "B" at a steady pace. If however, the first outer ring (wave generating) member 34, having an array of outer gear teeth 60 was rotated with respect to its adjacent (second) outer ring (wave generating) member 36 by an engaging gear "G" on a small motor "M", the driven drum 50 (or "D") supporting the conveyor belt (or conveyed belt) "B" driven by the external gear member 36 through external gear 16 would be rotated at a slightly different rotational speed, so as to adjust (alter) the tension of the belt "B" driven by one drum "D" of the two drums (not shown) supporting the belt "B". Depending on the direction of the rotation of the rotated outer wave generator 34, the belt "B" supported between two adjacent empowered drums may be given a tension or a loosening of that belt being driven by the harmonic drive gear assembly drive system 10.

Such a drive system may be utilized for a conveyed belt, such as for example, printed material, comprised of a film of plastic, paper or the like. A plurality of drums (or pulley devices or rolls in printing use) may support the elongated path of flexible web of material proceeding through a printing press "P", and each press "P" requiring modulation of speed to control the speed and tension of the material (belt) being printed, for example, newsprint, or a polymer film to be utilized as a wrapper. By virtue of the ability to tighten or loosen the web or belt comprising the film being printed, the print matter may be adjusted to prevent overlap or misprint thereof. Such events occur in color newspaper print, magazines and labels. Expensive controls and interconnected motors need not be utilized because of this simpler gearing arrangement of the present invention.

We claim:

1. A harmonic drive phasing differential gear assembly arranged in a housing, for the speed adjustment of an output shaft, comprising:
   a driven input shaft having a second end for imparting a first rotational speed to a co-axially arranged first end of said output shaft;
   a first external toothed gear on said second end of said input shaft, a second external gear disposed between said second end of said input shaft and said first end of said output shaft, and a third external toothed gear on said first end of said output shaft;
   a first flexible gear arranged radially outwardly of said first and second external gears, and a second flexible gear arranged radially outwardly of said second and third external gears; and
   a first wave generator arranged radially outwardly of said first flexible gear, and a second wave generator arranged radially outwardly of said second flexible gear, said input shaft and said output shaft arranged to rotate at a common speed through a coupling of said second external gear and first and second flexible gears, said first wave generator being actuatable to vary the output speed of said output shaft with respect to the speed of said input shaft, by rotating said first wave generator with respect to said input shaft.

2. The gear assembly as recited in claim 1, wherein said first and second wave generators are annular members having an inner opening, said inner opening of elliptical shape.

3. The gear assembly as recited in claim 2, wherein each of said wave generators includes a ball bearing assembly arranged within said inner opening.

4. The gear assembly as recited in claim 3, wherein one of said wave generators is rotatable with respect to the other wave generator of said wave generators, to induce wave generation in said flexible gear radially therewithin.

5. The gear assembly as recited in claim 4, wherein said output shaft is connected to a drum, said drum being arranged to rotatably support a conveyed belt.

6. The gear assembly as recited in claim 5, wherein said input shaft has an input drive member inputting rotation thereto.

7. A method of adjusting the tension in a moving belt carried on a rotatable drum supported on an axis, comprising the steps of:
   attaching one end of an output shaft of a harmonic drive transmission to said axis supporting said drum;
   placing a second external gear on the other end of said output shaft, said second external gear having a second wave generator and a second flexspline disposed radially therearound;
   arranging a rotary powered input shaft into said harmonic drive transmission, in coaxial alignment with said output shaft, and a first external gear on a second end of said input shaft;
   said first external gear having a first wave generator and a first flexspline disposed radially therearound;
   connecting said first external gear to said second external gear by a middle external gear engaged to both of said first and second wave generators; and rotating said input shaft; and
   rotating said first wave generator with respect to said second wave generator to alter the rotational output speed of said output shaft with respect to the rotational input speed of said input shaft.

8. The method as recited in claim 7, including the step of:
   stopping the rotation of said first wave generator with respect to said second wave generator, once the tension in said belt is correct, to permit said input shaft and said output shaft to rotate at a common speed.

9. A method of correcting the alignment and printing of a web being carried through a printing press by adjusting the tension in said web carried on a rotatable drum supported on an axis, comprising the steps of:
   attaching one end of an output shaft of a harmonic drive transmission to said axis supporting said drum;
   placing a second external gear on the other end of said output shaft, said second external gear having a second wave generator and a second flexspline disposed radially therearound;
   arranging a rotary powered input shaft into said harmonic drive transmission, in coaxial alignment with said output shaft, and a first external gear on a second end of said input shaft, said first external gear having a first wave generator and a first flexspline disposed radially therearound;

connecting said first external gear to said second external gear by a middle external gear engaged to both of said first and second wave generators; and rotating said input shaft; and rotating said first wave generator with respect to said second wave generator to alter the rotational output speed of said output shaft with respect to the rotational input speed of said input shaft thereby adjusting the tension of said web being printed to correct the alignment of said web with respect to said printing press.

10. The method as recited in claim 9, including the step of:

stopping the rotation of said first wave generator with respect to said second wave generator once the tension in said web has been corrected, to permit said input shaft and said output shaft to thereby rotate at a common speed once the tension adjustment in said web has been made and the alignment of said web has been accomplished with respect to said printing press.

* * * * *